US006839633B1

(12) United States Patent
Basaki et al.

(10) Patent No.: US 6,839,633 B1
(45) Date of Patent: Jan. 4, 2005

(54) METHODS AND APPARATUS FOR IMAGING A SUBSURFACE FRACTURE (75) Inventors: Satoshi Basaki, Hachioji (JP); Kasumi Fujii, Tokyo (JP)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 10/461,617

(22) Filed: Jun. 13, 2003

(51) Int. Cl.[7] .............................................. G01V 1/28
(52) U.S. Cl. ........................................ 702/18; 702/11
(58) Field of Search .............................. 702/11, 12, 13, 702/17, 18

(56) References Cited

U.S. PATENT DOCUMENTS

| 4,760,563 | A | | 7/1988 | Beylkin | |
|---|---|---|---|---|---|
| 5,200,928 | A | | 4/1993 | MaCleod | |
| 5,278,805 | A | * | 1/1994 | Kimball | 367/32 |
| 5,999,486 | A | | 12/1999 | DeVault | |
| 6,654,688 | B1 | * | 11/2003 | Brie et al. | 702/2 |

OTHER PUBLICATIONS

H. Yamamoto, S. Watanabe, H. Mikada, T. Endo, A. Brie, "Fracture Imaging using Borehole Acoustic Reflection Survey", Proceedings of the 4th SEGJ Intl sympo, 1998, pp 375–382.

R.R. Stewart, J.E. Gaiser, R.J. Brown, D.C. Lawton, "Tutorial Converted–wave seismic exploration; Applications", Geophysics, vol. 68, No. 1, pp. 40–57, 2003.

A. Carswell, W.M. Moon, "Application of multiolfset vertical seismic profiling in fracture mapping", Geophysics, vol. 54, No. 6, pp. 737–746, 1989.

* cited by examiner

Primary Examiner—Donald McElheny, Jr.
(74) Attorney, Agent, or Firm—William L. Wang; Brigitte Jeffery; John Ryberg (57) ABSTRACT

A method and apparatus for imaging subsurface fractures using an ST plane for quick looks and quality checks at the wellsite. Incident angles of impinging acoustic waves with respect to receivers are estimated from actual and apparent slowness, and the position of the fracture is estimated from the travel time and incident angle. The fracture can be imaged by plotting values from the ST plane onto the position of the fracture.

41 Claims, 11 Drawing Sheets

METHODS AND APPARATUS FOR IMAGING A SUBSURFACE FRACTURE

FIELD OF THE INVENTION

The present invention relates generally to methods and apparatus for imaging subsurface features. More particularly, the present invention relates to imaging or indicating fractures using the slowness time plane.

BACKGROUND OF THE INVENTION

Subsurface formation analysis has enabled more efficient oil and gas recovery over the past several decades. One of the important features of a formation necessary for maximum oil and gas recovery is an understanding of its fracture systems. Formation fracture systems may be naturally occurring or a result of activities such as drilling or hydraulic fracturing operations. An understanding of formation fracture properties may, among other uses, facilitate recovery of hydrocarbons, prediction of future fractures, computation of optimum drilling directions, and data necessary for reservoir simulation.

There are currently several tools and methods for gathering acoustic data and methods for imaging fractures using a separate analysis remote from the wellsite. In these situations, the time delay between when data acquisition and when fracture imaging can be disadvantageous to operators. Thus the ability to image a subsurface fracture at the wellsite is desirable. Further the ability to perform a quality control check on data while still at the wellsite offers operational advantages. In addition, a fracture image generated at the wellsite can be a useful comparison to a fracture image generated by remote analysis to build confidence or suggest further investigation depending on the coherency of the separate images.

Nevertheless, imaging techniques require additional CPU usage, which is often at a premium at the wellsite. It is desirable for computation speed to be fast, but also for CPU usage to be light, so that imaging fractures does not affect the data acquisition associated with formation evaluation.

Data for generating images of a fracture or other formation features are often provided from acoustic tools. A primary use of borehole acoustic measurements is the estimation of Compressional (P) and/or shear (S) wave formation slowness. The estimation of compressional and/or shear wave formation slowness is often expressed as an ST (slowness vs. time) plane and can be visualized at the wellsite with current technology. However, present methods do not fully utilize the ST plane. Therefore, the present invention contemplates making use of the ST plane for imaging a fracture.

SUMMARY OF THE INVENTION

The present invention meets the above-described needs and others. Specifically, the present invention provides a method of imaging subsurface formation features including: (a) computing a conversion/reflection point position for a feature of interest; and (b) plotting a value of an ST plane for the conversion/reflection point onto the conversion/reflection point position. The feature may be a formation fracture. The method may also include repeating steps (a)–(b) at periodic depths or all depths of interest. The computing of a conversion/reflection point position may include estimating an incident angle of a wave converted or reflected by the feature of interest with respect to a first receiver. Further, the estimating may include measuring an apparent slowness value between the first receiver and a second receiver, and using known shear or compressional slowness values. The estimate of the incident angle may be calculated as the arccosine of the apparent slowness value divided by the known shear or compressional slowness value According to some aspects, the computing of the conversion/reflection point position includes limiting the conversion/reflection point to a position along an angle of incidence line defined by the incident angle. The computing of a conversion/reflection point position further includes using the incident angle, a linear distance between a transmitter and the first receiver, and a travel time from the transmitter to the first receiver via the conversion/reflection point. The method may also include reversing the positions of wave conversion areas, wave reflection areas, or both wave conversion and wave reflection areas of the ST plane to distinguish between any overlapping areas corresponding to coherent P-S conversions (P waves converted to S waves) or S-P conversions (S waves converted to P waves) or P-P reflections (P waves reflected to P waves).

Another aspect of the invention provides a method of imaging a subsurface fracture including: (a) estimating an incident angle of the fracture with respect to a first receiver; (b) computing a conversion/reflection point position using the incident angle and a wave travel time between a transmitter and the first receiver; and (c) plotting the value of an ST plane for the conversion/reflection point onto the conversion/reflection point position. The wave travel time corresponds to a travel time of a wave through the conversion/reflection point where the travel time is taken from a point on the ST plane. The point may be selected from within a window defined between an approximate end of a compressional wave and an approximate start of a shear wave on a time axis of the ST plane, and between approximate areas of the ST plane slower than the compressional wave and faster than the shear wave on a slowness axis for P-S wave conversions. The point may also be selected from within a window defined between an approximate end of a compressional wave and an approximate start of a shear wave on a time axis of the ST plane, and in approximate areas of the ST plane faster than the compressional wave on a slowness axis for S-P conversions and P-P reflections.

Another aspect of the invention provides a method of using an ST plane for fracture imaging including: windowing a first portion of the ST plane between an approximate end of a compressional wave and an approximate start of a shear wave on a time axis of the ST plane, and between approximate areas of the ST plane slower than the compressional wave and faster than the shear wave on a slowness axis for P-S wave conversions; windowing a second portion of the ST plane between the approximate end of the compressional wave and the approximate start of the shear wave on the time axis of the ST plane, and in areas of the ST plane approximately faster than the compressional wave on a slowness axis for S-P conversions and P-P reflections; and plotting a value of a point inside one of the first or second portions of the ST plane at a conversion/reflection point. According to this aspect, a position of the conversion/reflection point may be computed by estimating an incident angle of a wave from a fracture with respect to a receiver; where the incident angle is estimated using a measured apparent slowness value and known shear or compressional slowness values.

Another aspect of the present invention provides a method of imaging a subterranean fracture including plotting ST plane values from points in a selected window of the ST plane onto computed conversion/reflection point positions.

Another aspect provides an apparatus for imaging fractures of subterranean formations including: at least one acoustic transmitter; at least two acoustic receivers; a processor coupled to the acoustic transmitter, the acoustic receivers, or both, and programmed to: (a) generate an ST plane plot; (b) compute a position of a fracture conversion/reflection point; and (c) plot a value of the ST plane for the conversion/reflection point onto the conversion/reflection point position. Steps (b)–(c) may be repeated at all depths of interest. According to some aspects, the at least one transmitter and at least two acoustic receivers are an array of transmitters and receivers. With an array of receivers, the processor may be programmed to reverse positions of wave conversion areas, wave reflection areas, or both wave conversion and wave reflection areas of the ST plane to distinguish between any overlapping areas corresponding to coherent P-S/S-P conversions or P-P reflections.

Another aspect provides a method of imaging a subterranean formation fracture including: (a) generating acoustic waves with a transmitter; (b) receiving the acoustic waves using at least two receivers and generating acoustic raw data; (c) creating an ST plane from the acoustic raw data; (d) creating windows for P-S and S-P conversion waves and P-P reflection waves on the ST plane where P-S/S-P conversions and P-P reflections can be observed; (e) taking a value on the ST plane of a point inside one of the windows; (f) computing an incident angle of an acoustic wave from the fracture with respect to the receivers; (g) computing a position of a wave conversion point at the fracture; (h) plotting the value taken from the ST plane onto the computed position of the conversion point; and repeating steps (a)–(h) at all depths of interest.

Another aspect provides a method of removing noise from a fracture image created using data from an ST plane including: reversing positions of wave conversion areas, wave reflection areas, or both wave conversion and wave reflection areas of the ST plane to distinguish between any overlapping areas. The reversing of wave reflection areas may include reversing between P-P reflections generated from an upper side and a lower side of a fracture and may be facilitated by an array of acoustic transmitters and receivers.

Additional advantages and novel features of the invention will be set forth in the description which follows or may be learned by those skilled in the art through reading these materials or practicing the invention. The advantages of the invention may be achieved through the means recited in the attached claims.

BRIEF DESCRIPTION OF THE DRAWINGS

The accompanying drawings illustrate preferred embodiments of the present invention and are a part of the specification. Together with the following description, the drawings demonstrate and explain the principles of the present invention.

Throughout the drawings, identical elements are designated by identical reference numbers. While the invention is susceptible to various modifications and alternative forms, specific embodiments have been shown by way of example in the drawings and will be described in detail herein. However, it should be understood that the invention is not intended to be limited to the particular forms disclosed. Rather, the invention is to cover all modification, equivalents and alternatives falling within the scope of the invention as defined by the appended claims.

DETAILED DESCRIPTION OF THE PREFERRED EMBODIMENTS

Illustrative embodiments and aspects of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, that will vary from one implementation to another. Moreover, it will be appreciated that such a development effort might be complex and time-consuming, but would nevertheless be a routine undertaking for those of ordinary skill in the art having the benefit of this disclosure.

The present invention contemplates use of an ST plane for acoustic imaging of features of interest in a subterranean formation. The feature of interest according to one aspect of the invention is a formation fracture, but the methods presented herein are not so limited. The methods and apparatus of the present invention are preferably used for quick-checking formation features (such as fractures) at a wellsite. However, the methods and apparatus described herein may also be used as a primary imaging technique, if desired.

Preferably, the CPU usage implementing methods of the present invention is light, so that it does not affect acoustic data acquisition that may be analyzed for other purposes. In order to keep CPU usage to a minimum, according to the present invention computations may be relatively simple, as described more fully below.

Figure 1:
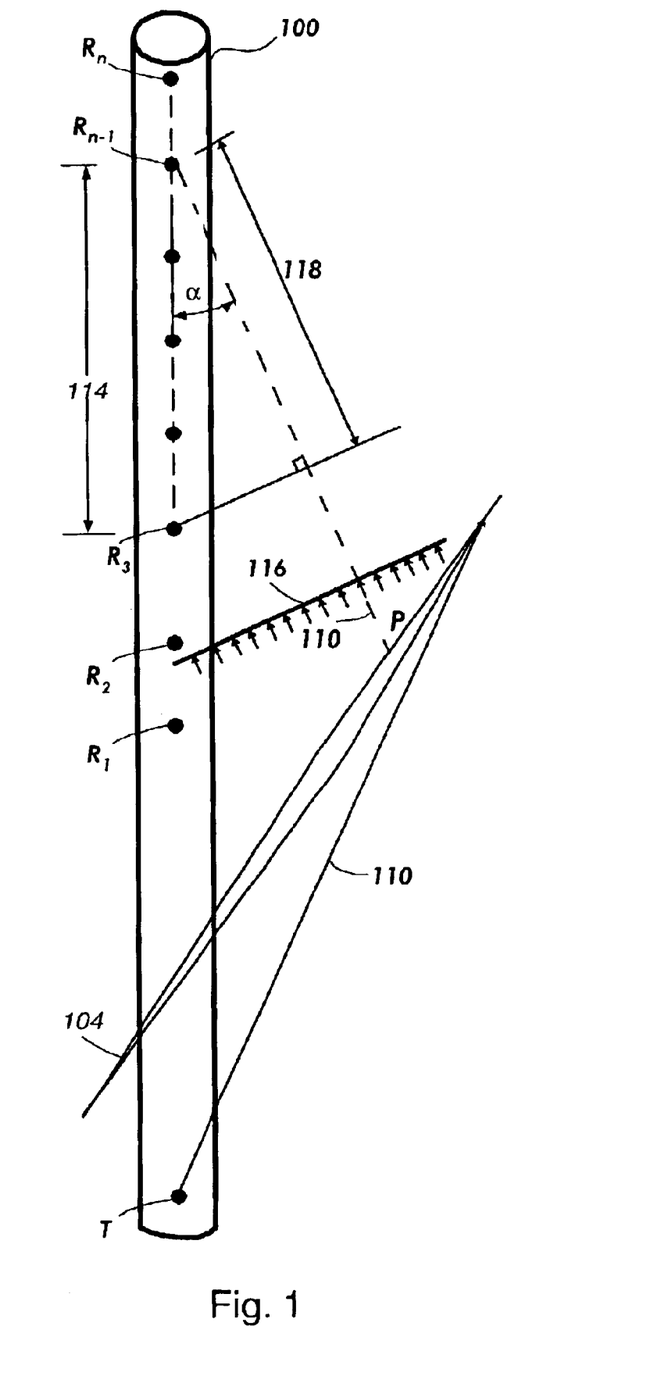
FIG. 1 is a simplified view of an acoustic tool and a fracture, with wave travel path approximations shown, according to one aspect of the present invention.

Turning now to the figures, and in particular to FIG. 1, a simplified view of an acoustic tool (100) is shown. The acoustic tool (100) is typical of many tools available from various manufacturers, including Schlumberger. The acoustic tool (100) includes at least one acoustic transmitter (T) capable of generating acoustic waves that are transmitted through adjacent formations. In some embodiments, at least one monopole acoustic transmitter is included. The acoustic tool (100) also includes two or more receivers ($R_1$–$R_n$) as shown in the figure. According to the illustration of FIG. 1, the acoustic tool (100) includes eight receivers ($R_1$–$R_n$) and traverses a formation feature, which in the present embodiment is a fracture (104). Waves generated by the acoustic transmitter (T) follow wave paths, for example a first wave path (110) extending from the transmitter (T) to the fracture (104), and then from the fracture (104) to a receiver ($R_1$–$R_n$). A wave front (116) traveling along the wave path (110) is shown after the wave has crossed the fracture (104). It will be understood that the wave path (110) and wave front (116) are exemplary in nature and used for purposes of facilitating a discussion of the principles of the invention. Many other waves in addition to those represented as traveling along the wave path (110) would also be present in an actual implementation. The wave path (110) represents wave travel path approximations as waves travel from the transmitter (T), across the fracture (104) and to the receivers ($R_1$–$R_n$). A processor such as a computer may be on-board the acoustic tool (100) or in remote communication with the tool (100) for control, operation, data acquisition, calculation, or other purposes.

As shown in FIG. 1, as the waves (along travel path 110) reach and traverse the fracture (104), they may be converted and/or reflected. For example, P-waves may be converted into S-waves (P-S conversion), S-waves may be converted into P-waves (S-P conversion), and P-waves may reflected into P-waves (P-P reflection). The location of the conversion and/or reflection point for the wave travel path (110) is labeled (P) and corresponds to the fracture (104) location. According to methods of the present invention, the fracture locations are imaged. Therefore, in order to image the fracture locations, the position of the conversion/reflection points (P) must be calculated. One way the location of the conversion/reflection points (P) may be computed is discussed below.

Continuing to refer to FIG. 1, as the wave front (116) moves along the wave path (110), it will cross and be detected by the receivers ($R_1$–$R_n$). The wave front (116), however, will cross the receivers ($R_1$–$R_n$) at different times. It is assumed that the wave front (116) follows the straight, direct wave path (110) as it crosses all of the receivers ($R_1$–$R_n$). It is therefore also assumed that the travel time difference between two receivers (in the present example $R_3$ and $R_{n-1}$) is caused by the travel path distance. The travel path distance is equal to the product of the distance between the two receivers ($R_3$ and $R_{n-1}$) and the cosine of an angle ($\alpha$) incident to the receivers. The angle of incidence ($\alpha$) is defined by a line (114) extending between the two receivers ($R_3$–$R_{n-1}$) and a leg (118) of the wave path (110) extending from the second receiver ($R_{n-1}$) normal to the wave front (116). The angle of incidence ($\alpha$) may be computed using simple trigonometric relations from the actual slowness measurements and the apparent slowness measurements collected by the receivers ($R_3$–$R_{n-1}$) according to the following equation:

$$\cos(\alpha) = \frac{\text{ApparentSlowness}}{\text{ActualSlowness}} \qquad (1)$$

where apparent slowness is the difference in the arrival time between the first and second receivers ($R_3$–$R_{n-1}$) shown in FIG. 1 divided by the distance (114) between the first and second receivers ($R_3$–$R_{n-1}$), and the actual slowness is the difference in the arrival time between the first and second receivers ($R_3$–$R_{n-1}$) shown in FIG. 1 divided by the actual distance (118) the wave traveled during the difference in arrival time along the wave path (110) extending between the fracture (104) and the second receiver ($R_{n-1}$). The actual and apparent slowness values are calculated from the data received by the receivers ($R_3$ and $R_{n-1}$).

Figure 2:
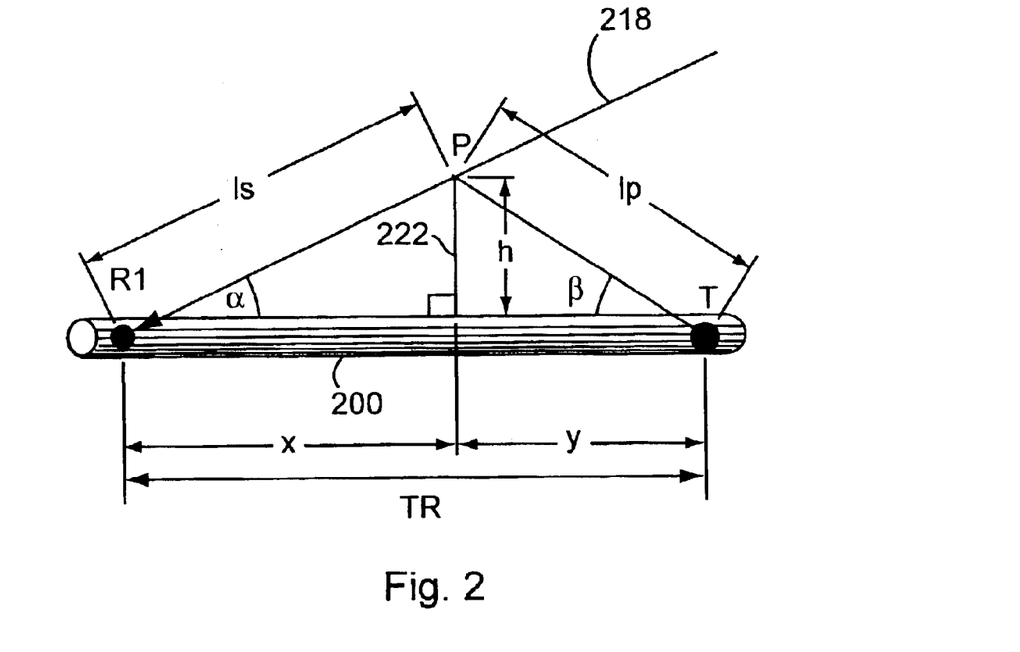
FIG. 2 is a simplified view of an acoustic tool illustrating computation of a conversion/reflection point according to one method of the present invention.

Turning next to FIG. 2, once the incident angle ($\alpha$) has been computed, the location of a conversion/reflection point (P) [conversion point for an initial S-wave converted to a P-wave or an initial P-wave converted to an S-wave; reflection point for initial P-wave reflected into a P-wave] may be determined at all depths of interest. In order to do so, the conversion point (P) is assumed to be located on an extended line (218) defined by the incident angle ($\alpha$) from the receiver ($R_{n-1}$) according to one aspect of the invention. For convenience of the following description, a distance between the receiver ($R_{n-1}$) and the conversion point (P) is labeled "ls," and a distance between the conversion point (P) and the transmitter (T) is labeled "lp." Accordingly, the travel time between the transmitter (T) and the receiver ($R_{n-1}$) via the conversion point (P) may be expressed as:

$$tt=ls^*\text{ShearSlowness}+lp^*\text{CompressionalSlowness} \qquad (2)$$

It will be appreciated, of course, that the equation (2) is directed to P-waves converted into S-waves (P-S conversion), and that the equation (2) may be altered slightly for S-P conversion points and P-P reflection points. Shear slowness ("ss") and compressional slowness ("cs") may be abbreviated in the equations that follow.

According to FIG. 2, the geometry of an acoustic tool (200) is further labeled by a dimension defining a linear distance (TR) between the transmitter (T) and the receiver ($R_{n-1}$). This distance (TR) is subdivided into a first linear distance (x) between the receiver ($R_{n-1}$) and a perpendicular (222) of distance (h) to the conversion/reflection point (P), and a second linear distance (y) between the perpendicular (222) and the transmitter (T). With the geometry shown in FIG. 2, the distance (TR) between the receiver ($R_{n-1}$) and the transmitter (T) may be expressed as:

$$TR=x+y \qquad (3)$$

and the distance (h) between the tool (200) and the conversion/reflection point (P) expressed by $$h=x \tan \alpha = y \tan \beta \qquad (4)$$

Considering, according to ordinary trigonometric functions, that:

$$ls = \frac{x}{\cos\alpha}, \; lp = \frac{y}{\cos\beta}, \; \cos\beta = \frac{1}{\sqrt{\tan^2\beta + 1}}$$

travel time (tt) may be rewritten as:

$$tt = \frac{x}{\cos\alpha} \cdot ss + y \cdot cs\sqrt{\tan^2\beta + 1} \qquad (2')$$

Further, solving equation (3) for y yields:

$$y = TR - x \qquad (3')$$

and substituting this value of y in equation (4) yields:

$$x \tan\alpha = (TR - x) \tan\beta$$

which leads to:

$$\tan\beta = \frac{x \tan\alpha}{TR - x} \qquad (4')$$

Substituting the value of $\tan\beta$ from equation (4') into equation (2') gives:

$$\frac{x}{\cos\alpha} \cdot ss + y \cdot cs\sqrt{\left(\frac{x\tan\alpha}{TR-x}\right)^2 + 1} = tt$$

or $$\frac{x}{\cos\alpha} \cdot ss + \frac{y \cdot cs}{TR - x}\sqrt{(x \tan\alpha)^2 + (TR - x)^2} = tt \qquad (5)$$

The value of y given by equation (3') may then be substituted into equation (5), to obtain:

$$\frac{x}{\cos\alpha} \cdot ss + cs\sqrt{(x \tan\alpha)^2 + (TR - x)^2} = tt$$

By subtracting $$\frac{x}{\cos\alpha} \cdot ss$$

from both sides of this equation, it becomes:

$$cs\sqrt{(x \tan\alpha)^2 + (TR - x)^2} = \left(tt - \frac{x}{\cos\alpha} \cdot ss\right)$$

Squaring both sides of this result yields:

$$cs^2\{(x \tan\alpha)^2 + (TR - x)^2\} = \left(tt - \frac{x}{\cos\alpha} \cdot ss\right)^2$$

which leads to:

$$\frac{cs^2 - ss^2}{\cos^2\alpha}x^2 + 2 \cdot \left(\frac{tt \cdot ss}{\cos\alpha} - cs^2 TR\right)x + cs^2 TR^2 - tt^2 = 0 \qquad (6)$$

Equation (6) is a quadratic equation with two solutions:

$$x = \frac{cs^2 TR - \frac{tt}{\cos\alpha} \cdot ss \pm \sqrt{\left(\frac{tt}{\cos\alpha} \cdot ss - cs^2 TR\right)^2 - \frac{cs^2 - ss^2}{\cos^2\alpha}(cs^2 TR^2 - tt^2)}}{\frac{cs^2 - ss^2}{\cos^2\alpha}} \qquad (7)$$

And according to one aspect of the present invention, the positive smaller solution is chosen.

Once x is calculated, the distance (h) between the conversion point (P) and the tool (200) may be calculated as:

$$h = x \tan\alpha \qquad (8)$$

and the position of the conversion point can be determined directly from equations (7), and (8).

As mentioned above, the equations shown and relied upon based on equation (2) are specific to P-S wave conversions. However, S-P conversion points s may also be computed using the same calculations outlined above, after replacing equation (2) with:

$$ls \cdot cs + lp \cdot ss = tt \qquad (2')$$

for S-P conversions. For P-P-wave reflections, cs=ss because P-P-wave reflections propagate only as compressional waves. Thus P-P reflection points may be computed using the same calculations outlined above after replacing equation (2) with.

$$ls \cdot cs + lp \cdot cs = tt \qquad (2'')$$

for P-P reflections.

Figure 3:
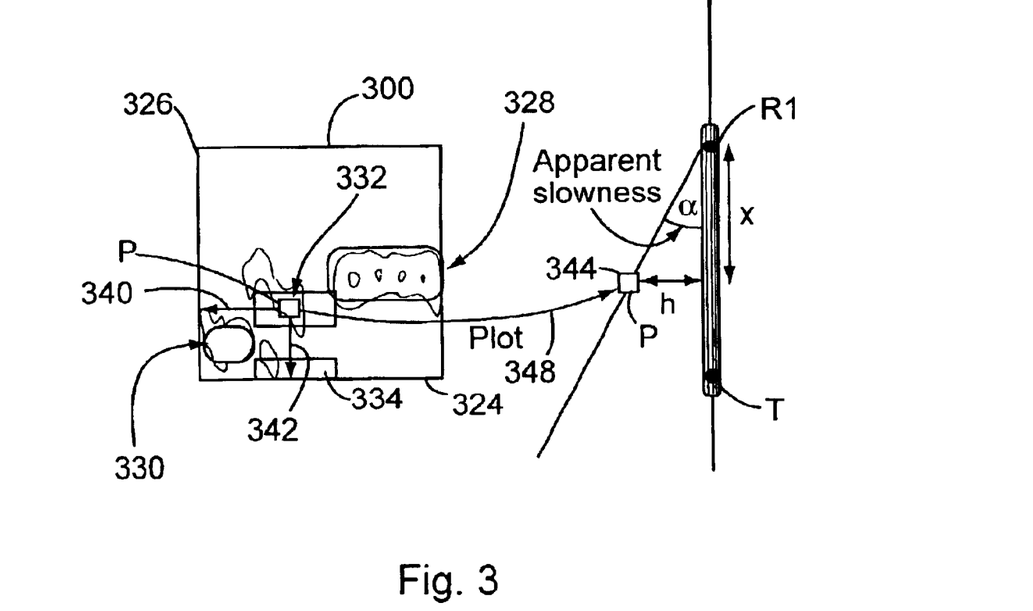
FIG. 3 is a simplified view of an acoustic tool and an ST plane, illustrating use of the ST plane for fracture imaging according to one aspect of the present invention.

Having a methodology for computing locations of the one or more conversion/reflection points (P), an ST plane (302) as illustrated in FIG. 3 may be used to image the conversion/reflection points and, for example, build an image of subterranean fractures corresponding to a series of computed conversion/reflection points (P). FIG. 3 shows the ST plane (302) built by data from the receivers of the acoustic tool (300). As mentioned above, the ST plane (302) may be computed according to conventional subterranean imaging techniques with time along an x-axis (324) and slowness along a y-axis (326).

The ST plane (302) shows an S-wave area (328) and a P-wave area (330). Windows for the P-S/S-P conversions and P-P reflections are defined on the ST plane (302) where the P-S/S-P conversions and P-P reflections can be observed. A window (332) for the P-S conversion is created between the approximate end of the P-wave area (330) and the approximate beginning of the S-wave area (328) on the time axis (324), and between areas approximately slower than the P-wave but faster than the S-wave on the slowness axis (326).

The location of the P-S conversion window (332) is chosen as defined above because the apparent slowness of P-S conversion is faster than the shear slowness. Further, the P-S converted wave arrives between the P-wave and the S-wave.

Similar to the P-S conversion window (332), a window (334) for S-P conversion waves and P-P reflection waves is created. The S-P conversion and P-P reflection window (334) is defined between the approximate end of the P-wave area (330) and the approximate beginning of the S-wave area (328) on the time axis (324), and in the areas approximately faster than the P-waves on the slowness axis (326).

The S-P conversion/P-P reflection window (334) is so defined because the apparent slowness for the S-P conversion waves and P-P reflection waves are faster than the compressional slowness.

With the P-S conversion and S-P conversion/P-P reflection windows (332 and 334, respectively) defined, a point is selected. For example, as shown in FIG. 3, the P-S conversion point (P) at the approximate center of the P-S conversion window (332) is chosen. The P-S conversion point (P) corresponds to an apparent slowness value (340) on the slowness axis (326) and a travel time (342) on the time axis (324).

Applying the principles described above, the incident angle (α) for the P-S conversion point (P) may be calculated from the apparent slowness (340) and the actual slowness (352). In addition, using the calculated incident angle (a), TR length, travel time (tt) (342), and shear and compressional slowness, the position of the P-S conversion point (P) may be computed according to the principles discussed above.

The values of the P-S conversion point (P) (or any other point selected according the principles above) from the ST plane (300) may then be plotted onto the conversion point position (344) that is calculated as described above. An arrow (348) illustrates the principle of plotting the values from the ST plane (300) for the conversion point (P) at the calculated conversion point position (344). It will be understood, of course, that this process may be repeated any number of times for all depths of interest until the desired image is built.

The method and apparatus described above have been implemented for both actual and synthetic data, the results of which are described below.

Figure 4:
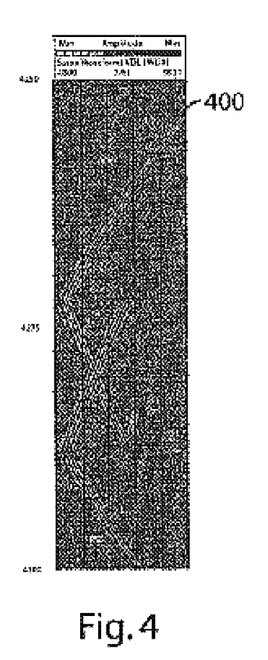
FIG. 4 is a chart illustrating raw waveform synthetic data for use in applying methods of the present invention.

According to one example implementing the principles of the present invention, a fracture image was created using synthetic modeling data. Referring to FIG. 4, a synthetic waveform data set (400) was created by MatLab, although data sets may be provided by any of a number of other programs. The synthetic waveform data set (400) of FIG. 4 was then loaded onto a commercially available processor. The synthetic waveform data set (400) has P-S/S-P wave conversions and P-P wave reflections, but no direct P and S-waves. Random noise was also added to the data.

The parameters of the exemplary implementation associated with FIG. 4 were as follows:

TR spacing: 50 feet

Compressional Slowness: 100 $\mu s/f$

Shear slowness: 160 $\mu s/f$

Fracture angle: 30 degrees

Sampling interval: 10 $\mu s$

Word count: 512

Sampling delay: 4800 $\mu s$

Figure 5:
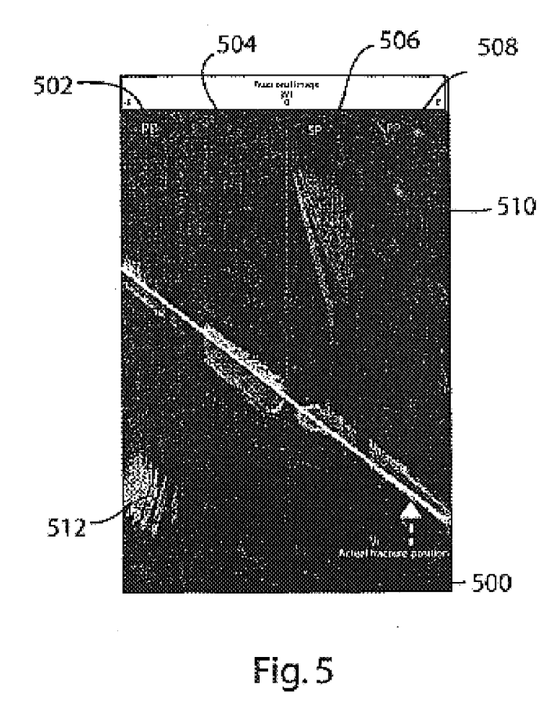
FIG. 5 is a chart illustrating the results of fracture imaging by using the ST plane for the synthetic data of FIG. 4 according to methods of the present invention.

FIG. 5 illustrates the results of the fracture imaging technique using the ST plane as described above. The actual fracture position is shown as a solid line (500). The fracture image created according to principles of the present invention is shown as a combination of four subsections. The four subsections correspond with images generated from two P-P reflections (502 and 508), the P-S conversion (504), and the S-P conversion (506).

An upper area (510) in the S-P conversion (506) and a lower area (512) in the left P-P reflection (502) exhibit noise, which is a result of the overlap in the windows for S-P conversion and P-P reflection (discussed in more detail below). The noise may also be a result of processing P-P reflection as an S-P conversion, and vice versa.

Nevertheless, the coherency of the image allows a relatively clear view of the fracture at the correct fracture position. The noise shown in FIG. 5 may, however, become problematic in some applications. The noise and its removal are further explained with reference to FIG. 6.

Figure 6:
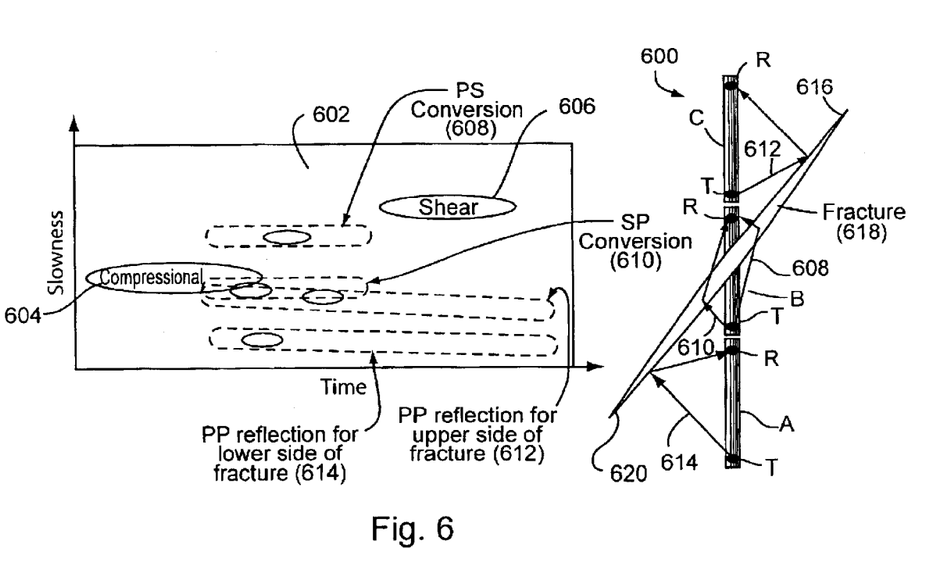
FIG. 6 shows a range of high coherent area movement on an ST plane and an array of transmitters and receivers according to one aspect of the present invention.

FIG. 6 illustrates a ST plane generated for using a receiver array; this method of generating a ST plane is known to those skilled in the art. Shown on an ST plane (602) are six highly coherent areas corresponding to P-wave (604), S-wave (606), P-S conversion (608), S-P conversion (610), and first and second P-P reflections (612 and 614). The first P-P reflection corresponds to an upper side (616) of a fracture (618), and the second P-P reflection corresponds to a lower side (620) of the fracture (618).

Figure 7:
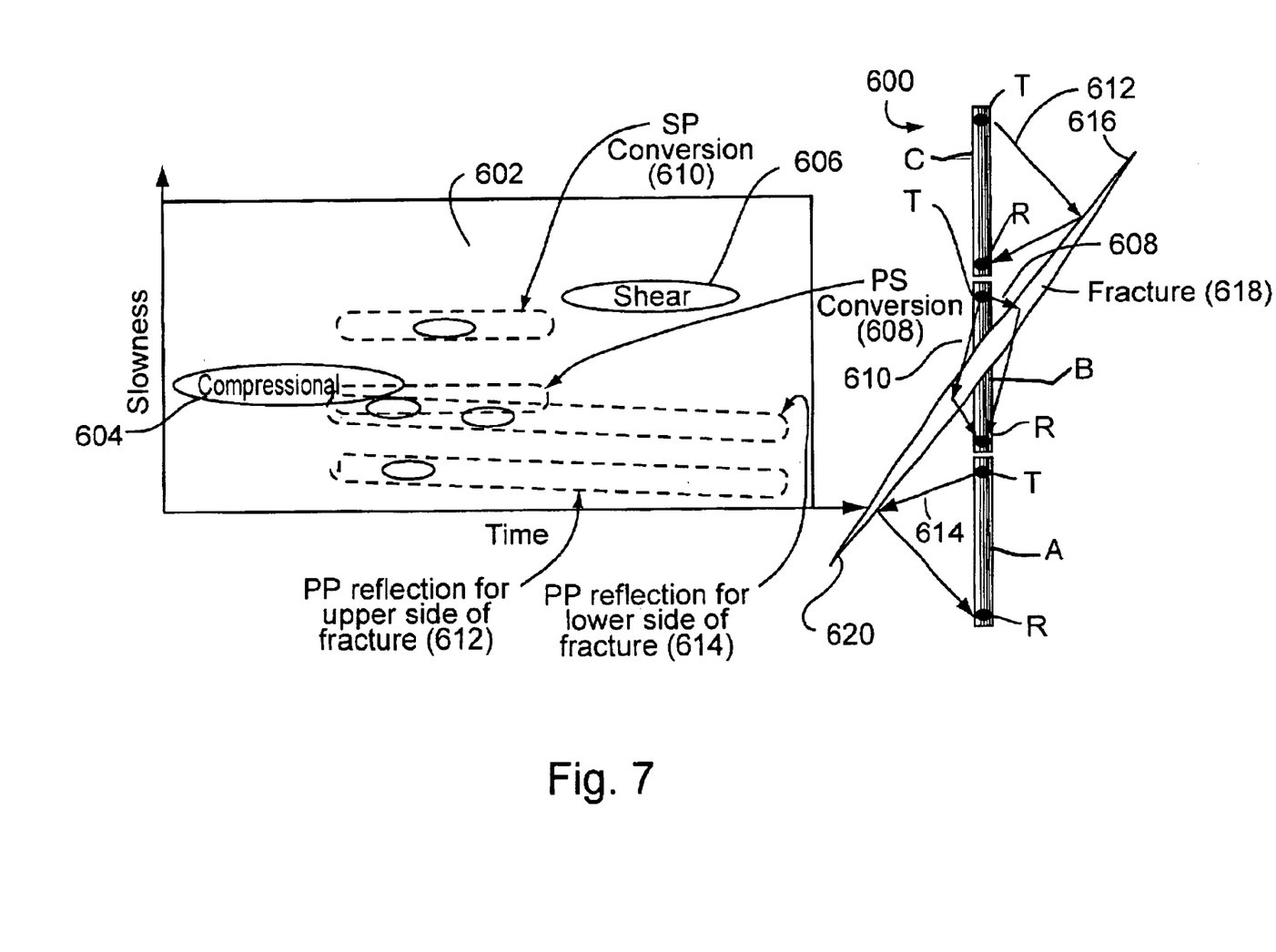
FIG. 7 shows the range of high coherent area movement on an ST plane of FIG. 6 reversed according to one aspect of the present invention.

As an acoustic tool (600) moves in a borehole (for example to the three positions labeled (A), (B), and (C) in FIGS. 6–7), the ranges for the P-S conversion (608), S-P conversion (610), and first and second P-P reflection (612 and 614) move and also overlap with other coherent ranges. The overlap causes the noise shown in FIG. 5, due to the difficulty in separating the overlapping direct waves, conversions, and reflections.

In order to overcome the overlap issue, the acoustic tool (600) may facilitate building a data array that is generated by the transmitter (T) as the tool (600) is fired at various positions in the borehole and the waveforms are received by each receiver. This transmitter array can be used to reverse the position of the P-S conversion (608) and the S-P conversions (610) and the P-P reflection from the upper side (612) and the P-P reflection from the lower side (614) as can be observed by comparing FIGS. 6 and 7. By reversing these positions, the coherent ranges associated with various waveforms can be better defined and overlaps separated. Preferably, the transmitter (T) is fired at intervals such that the distance the tool moves corresponds to a multiple of the spacing between adjacent receivers (R) (often an array of eight receivers, but necessarily so). Therefore, for example, waveforms that are received by a first receiver ($R_n$) at a first tool position (A) can be compared to waveforms received by a second receiver ($R_{n-1}$) at a second position located uphole a distance equal to the distance between the first ($R_n$) and second ($R_{n-1}$) receivers. This process of data array-building can be repeated for as many positions as desired. However, for a single ray comparison, there may be data collected at as many positions as there are receivers, minus one. That is, if there is an array of eight receivers, a waveform comparison among seven different positions may be made if the transmitter (T) is fired at intervals corresponding to the receiver spacing (there will be fewer direct comparisons if the transmitter (T) is fired at intervals corresponding to a multiple of two or greater times the receiver spacing).

Figure 8:
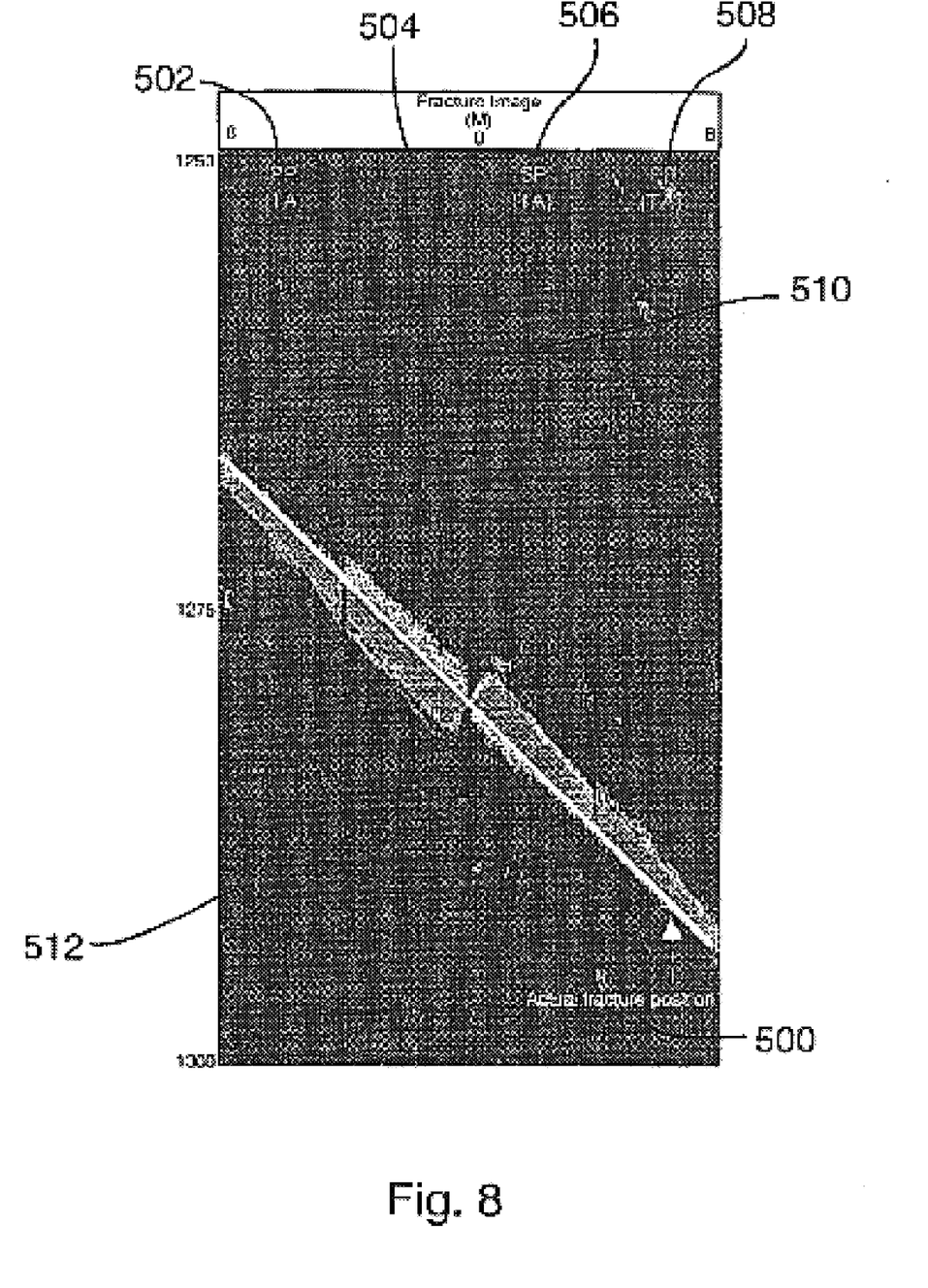
FIG. 8 illustrates a fracture image utilizing a receiver and transmitter array process according to one aspect of the present invention.

FIG. 8 shows the results of fracture imaging using the array (600) of transmitters (T) and receivers (R) for the synthetic data of FIG. 4. Comparing FIG. 8 to FIG. 5, the noise is significantly reduced or eliminated, and the image for the first P-P reflection (502) and the S-P conversion (506) is much clearer.

It should be noted that the playback time for the whole set of synthetic data (about 200 m depth) was approximately one minute both with and without implementation of the fracture imaging process described herein. This indicates that the processing time for the fracture imaging is short and requires very little CPU time.

Figure 9:
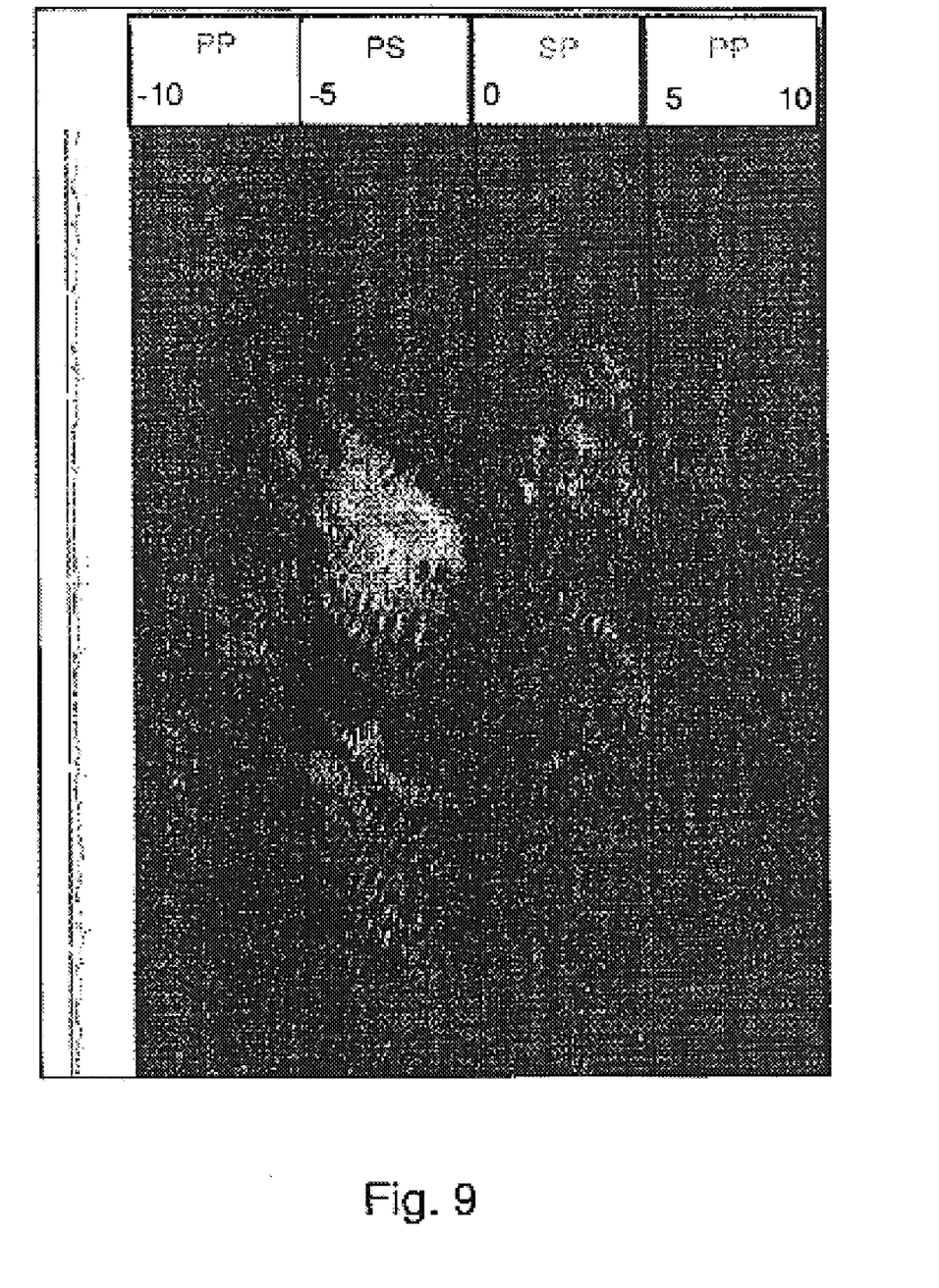
FIG. 9 shows the results of a fracture image generated from field data using the ST plane according to aspects of the present invention.
Figure 10:
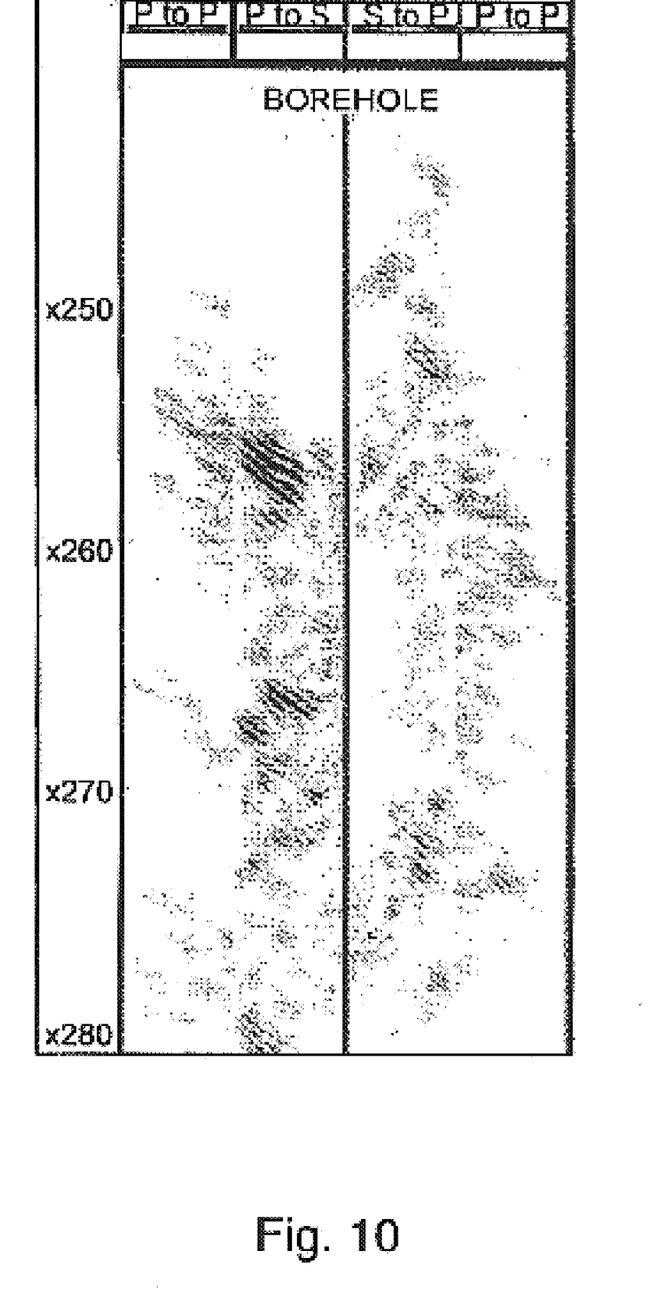
FIG. 10 shows actual GeoFrame® process data corresponding to the fracture images of FIG. 9.

Turning next to FIG. 9, the results of fracture imaging according to principles of the present invention is shown for actual field data. Comparing the results shown in FIG. 9 with GeoFrame® process data shown in FIG. 10, the more significant features of the formation are very well matched. Accordingly, the fracture imaging methods and systems according to the present invention may be used at the wellsite as a reliable quick look or quality check.

According to another aspect of the present invention, a time projection of the acoustic data represented by an ST plane (e.g. FIG. 3) may be implemented to indicate a possible fracture. This time-projection method will not show an image of a fracture, but can be used to indicate a possible fracture as discussed below.

Figure 11:
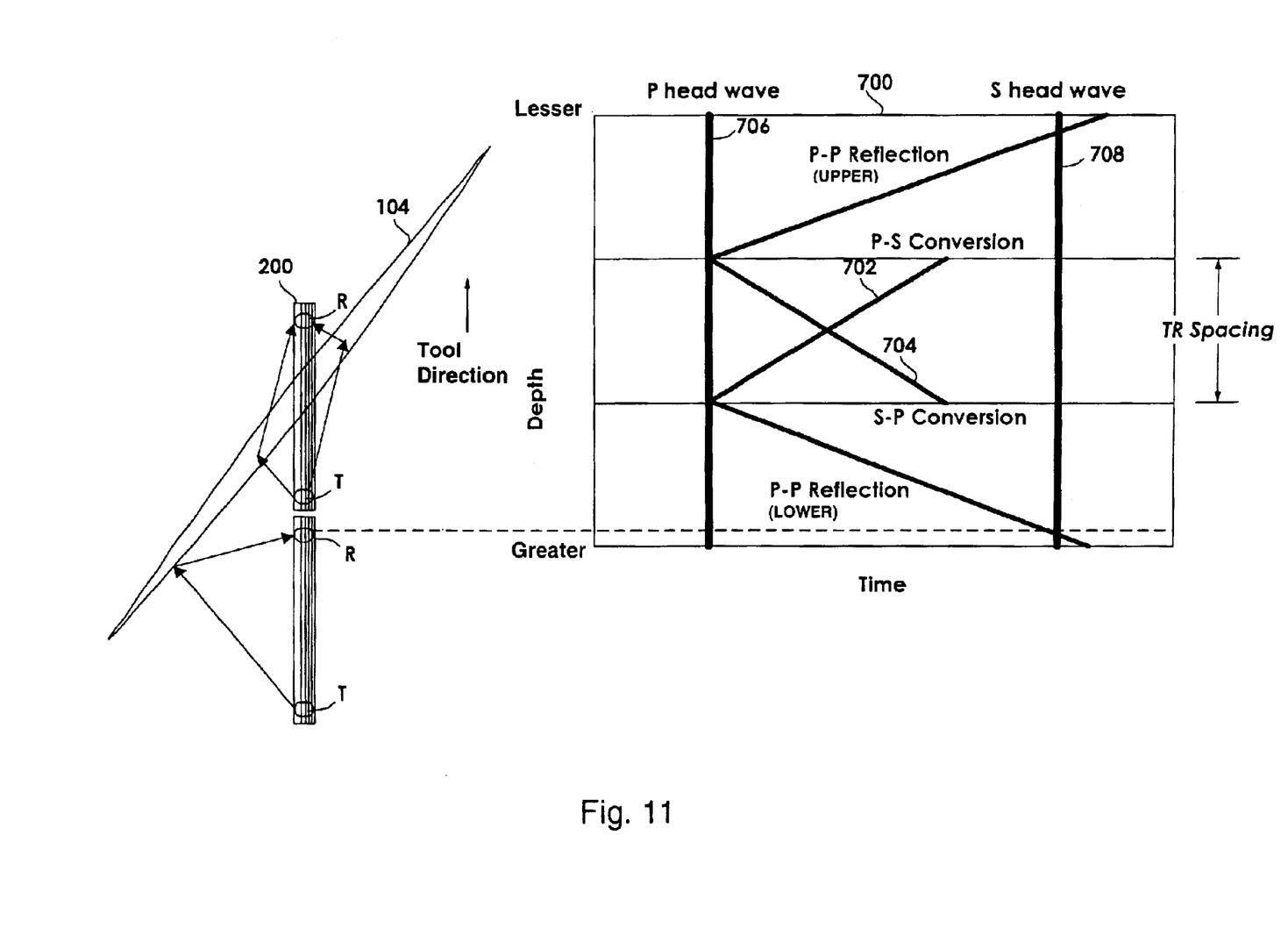
FIG. 11 shows a raw arrival time display and an associated acoustic tool according to one aspect of the present invention.

For each receiver array, an ST plane is created. It is known that acoustic wave mode conversion at a fracture exhibits a configuration as shown in FIG. 11. For each receiver, P-S converted waves (702) and S-P converted waves (704) arrive between P head wave (706) arrival and the S head wave (708) arrival. These two wave lines are symmetric and intersect. The TR spacing of the acoustic tool (FIG. 2, 200) bounds the height of these lines (702 and 704). In the presence of a fracture, such converted waves will be shown on the ST plane. Windows may be created and applied on the ST plane to separate the waves.

Figure 12:
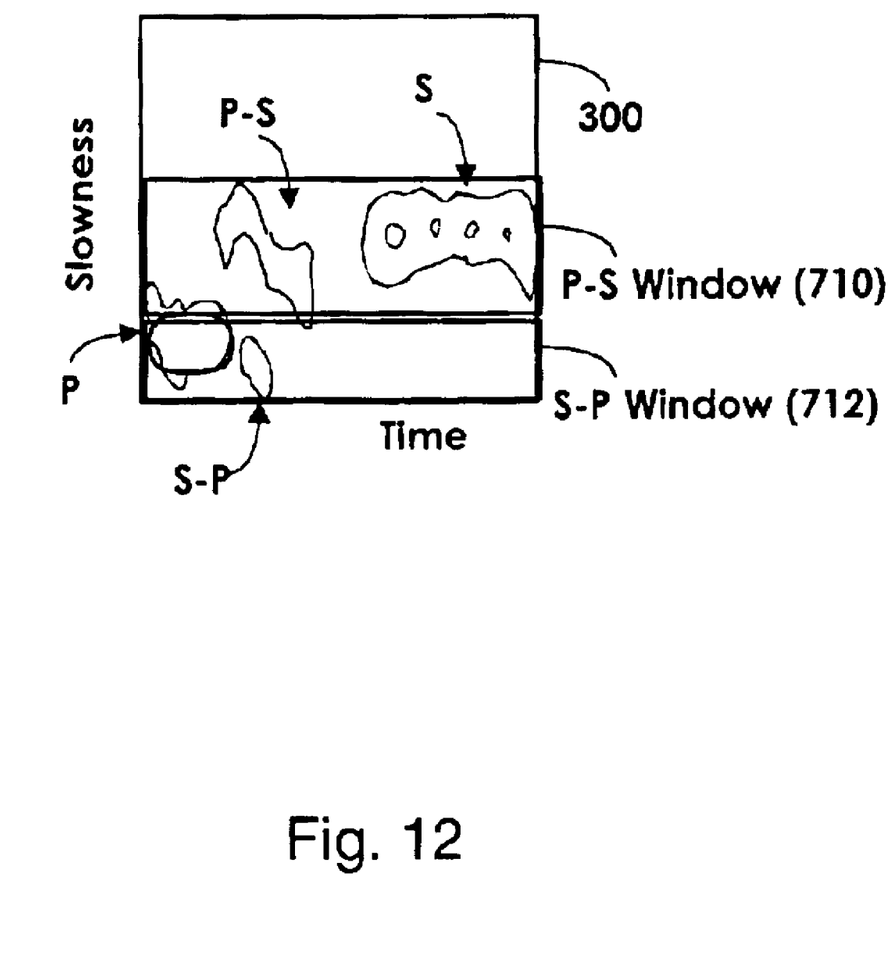
FIG. 12 shows a windowed ST plane according to another aspect of the present invention.

FIG. 12 shows an ST plane (300) displaying a P-S conversion within the P-S window (710) and an S-P conversion within the S-P window (712) for a particular depth. Each conversion may be projected on the time axis. These time projections may then be displayed with respect to depth. This results in display of the presence of P-S conversions or S-P conversions across a particular depth range, thereby indicating the possibility of a fracture in that depth range.

Figure 13:
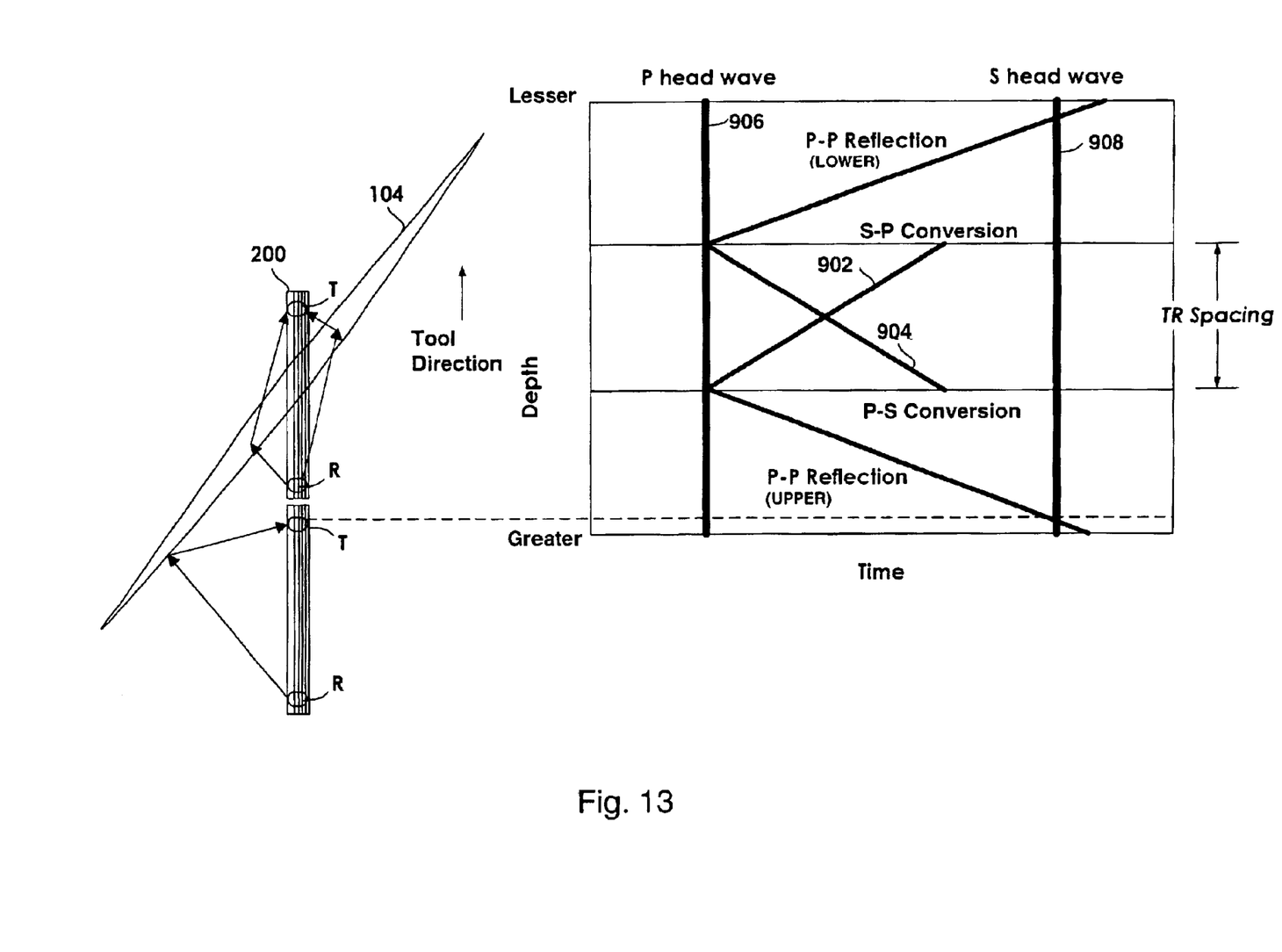
FIG. 13 shows a raw arrival time display and an associated acoustic tool according to another aspect of the present invention.

It can be appreciated that a transmitter array may be built from waveforms received by each receiver as the tool is fired at various positions in the borehole. As shown on FIG. 13, this transmitter array can be used to reverse the position of the P-S conversion (904), the S-P conversions (902), the P-P reflection from the upper side and the P-P reflection from the lower side. By reversing these positions, the coherent ranges associated with various waveforms can be better defined and overlaps separated. Preferably, the transmitter (T) is fired at intervals such that the distance the tool moves corresponds to a multiple of the spacing between adjacent receivers (R) (often an array of eight receivers, but necessarily so).

The preceding description has been presented only to illustrate and describe the invention and some examples of its implementation. It is not intended to be exhaustive or to limit the invention to any precise form disclosed. Many modifications and variations are possible in light of the above teaching.

The preferred aspects were chosen and described in order to best explain the principles of the invention and its practical application. The preceding description is intended to enable others skilled in the art to best utilize the invention in various embodiments and aspects and with various modifications as are suited to the particular use contemplated. It is intended that the scope of the invention be defined by the following claims.

What is claimed is:

1. A method of imaging subsurface formation features comprising:
   (a) computing a conversion/reflection point position for a feature of interest; and
   (b) plotting a value of an ST plane for the conversion/reflection point onto the conversion/reflection point position.

2. The method of claim 1, further comprising repeating steps (a)–(b) at all depths of interest.

3. The method of claim 1, further comprising repeating steps (a)–(b) at periodic depth intervals.

4. The method of claim 1, wherein the computing a conversion/reflection point position further comprises estimating an incident angle of a wave converted or reflected by the feature of interest with respect to a first receiver.

5. The method of claim 4, wherein the estimating further comprises measuring an apparent slowness value between the first receiver and a second receiver, and using known shear or compressional slowness values.

6. The method of claim 5, wherein the estimating further comprises calculating an arccosine of the apparent slowness value divided by the known shear or compressional slowness value.

7. The method of claim 4, wherein the computing a conversion/reflection point position further comprises limiting the conversion/reflection point to a position along an angle of incidence line defined by the incident angle.

8. The method of claim 7, wherein the computing a conversion/reflection point position further comprises using the incident angle, a linear distance between a transmitter and the first receiver, and a travel time from the transmitter to the first receiver via the conversion/reflection point.

9. The method of claim 1, wherein the feature of interest is a formation fracture.

10. The method of claim 1, further comprising reversing positions of wave conversion areas, wave reflection areas, or both wave conversion and wave reflection areas of the ST plane to distinguish between any overlapping areas corresponding to coherent P-S/S-P conversions or P-P reflections.

11. A method of imaging a subsurface fracture comprising:
   (a) estimating an incident angle of the fracture with respect to a first receiver;
   (b) computing a conversion/reflection point position using the incident angle and a wave travel time between a transmitter and the first receiver; and
   (c) plotting the value of an ST plane for the conversion/reflection point onto the conversion/reflection point position.

12. The method of claim 11, wherein the wave travel time corresponds to a travel time of a wave through the conversion/reflection point; and wherein the travel time is taken from a point on the ST plane.

13. The method of claim 12, wherein the point is selected from within a window defined between an approximate end of a compressional wave and an approximate start of a shear wave on a time axis of the ST plane, and between approximate areas of the ST plane slower than the compressional wave and faster than the shear wave on a slowness axis for P-S wave conversions.

14. The method of claim 12, wherein the point is selected from within a window defined between an approximate end of a compressional wave and an approximate start of a shear wave on a time axis of the ST plane, and in approximate areas of the ST plane faster than the compressional wave on a slowness axis for S-P conversions and P-P reflections.

15. The method of claim 11, further comprising repeating steps (a)–(c) at all depths of interest or at periodic depth intervals.

16. The method of claim 11, wherein the estimating further comprises measuring an apparent slowness value between the first and a second receiver, and using known shear or compressional slowness values.

17. The method of claim 16, wherein the estimating further comprises calculating an arccosine of the apparent slowness value divided by the known shear or compressional slowness value.

18. The method of claim 11, wherein the computing a conversion/reflection point position further comprises limiting the conversion/reflection point to a position along an angle of incidence line defined by the incident angle.

19. The method of claim 18, wherein the computing a conversion/reflection point position further comprises using the incident angle, a linear distance between the transmitter and the first receiver, and a travel time from the transmitter to the first receiver via the conversion/reflection point.

20. The method of claim 11, further comprising:
(d) reversing positions of wave conversion areas, wave reflection areas, or both wave conversion and wave reflection areas of the ST plane with an array of transmitters and receivers.

21. A method of using an ST plane for fracture imaging comprising:
windowing a first portion of the ST plane between an approximate end of a compressional wave and an approximate start of a shear wave on a time axis of the ST plane, and between approximate areas of the ST plane slower than the compressional wave and faster than the shear wave on a slowness axis for P-S wave conversions;
windowing a second portion of the ST plane between the approximate end of the compressional wave and the approximate start of the shear wave on the time axis of the ST plane, and in areas of the ST plane approximately faster than the compressional wave on a slowness axis for S-P conversions and P-P reflections; and
plotting a value of a point inside one of the first or second portions of the ST plane at a conversion/reflection point.

22. The method of claim 21, wherein a position of the conversion/reflection point is computed by estimating an incident angle of a wave from a fracture with respect to a receiver; wherein the incident angle is estimated using a measured apparent slowness value and known shear or compressional slowness values.

23. The method of claim 22, wherein the estimating further comprises calculating an arccosine of the apparent slowness value divided by the known shear or compressional slowness value.

24. The method of claim 22, wherein the computing of the conversion/reflection point position further comprises using the incident angle, a linear distance between a transmitter and the receiver, and a travel time from the transmitter to the receiver via the conversion/reflection point.

25. A method of imaging a subterranean fracture comprising: plotting ST plane values from points in a selected window of the ST plane onto computed conversion/reflection point positions.

26. An apparatus for imaging fractures of subterranean formations comprising:
at least one acoustic transmitter;
at least two acoustic receivers;
a processor coupled to the acoustic transmitter, the acoustic receivers, or both, and programmed to:
(a) generate an ST plane plot;
(b) compute a position of a fracture conversion/reflection point; and
(c) plot a value of the ST plane for the conversion/reflection point onto the conversion/reflection point position.

27. The apparatus of claim 26, wherein the processor is programmed to repeat steps (b)–(c) at all depths of interest.

28. The apparatus of claim 26, wherein the computing of the position of the fracture conversion/reflection point further comprises estimating an incident angle between a line between the at least two acoustic receivers and a wavefront.

29. The apparatus of claim 28, wherein the estimating further comprises measuring an apparent slowness value and using known shear or compressional slowness values.

30. The apparatus of claim 29, wherein the estimating further comprises calculating an arccosine of the apparent slowness value divided by the known shear or compressional slowness value.

31. The apparatus of claim 28, wherein the computing a conversion/reflection point position further comprises limiting the conversion/reflection point to a position along an angle of incidence line defined by the incident angle.

32. The apparatus of claim 31, wherein the computing a conversion/reflection point position further comprises using the incident angle, a linear distance between the transmitter and a first of the two acoustic receivers, and a travel time from the transmitter to the first receiver via the conversion/reflection point.

33. The apparatus of claim 26, wherein the at least one transmitter and at least two acoustic receivers comprise an array of transmitters and receivers.

34. The apparatus of claim 33, wherein the processor is programmed to reverse positions of wave conversion areas, wave reflection areas, or both wave conversion and wave reflection areas of the ST plane to distinguish between any overlapping areas corresponding to coherent P-S/S-P conversions or P-P reflections.

35. A method of imaging a subterranean formation fracture comprising:
(a) generating acoustic waves with a transmitter;
(b) receiving the acoustic waves using at least two receivers and generating acoustic raw data;
(c) creating an ST plane from the acoustic raw data;
(d) creating windows for P-S and S-P conversion waves and P-P reflection waves on the ST plane where P-S/S-P conversions and P-P reflections can be observed;
(e) taking a value on the ST plane of a point inside one of the windows;
(f) computing an incident angle of an acoustic wave from the fracture with respect to the receivers;
(g) computing a position of a wave conversion/reflection point at the fracture;
(h) plotting the value taken from the ST plane onto the computed position of the conversion/reflection point;
and repeating steps (a)–(h) at all depths of interest.

36. The method of claim 35, wherein the creating windows further comprises:
windowing a first portion of the ST plane between an approximate end of a compressional wave and an approximate start of a shear wave on a time axis of the ST plane, and between approximate areas of the ST plane slower than the compressional wave and faster than the shear wave on a slowness axis for P-S wave conversions; and
windowing a second portion of the ST plane between the approximate end of the compressional wave and the approximate start of the shear wave on the time axis of the ST plane, and in approximate areas of the ST plane faster than the compressional wave on a slowness axis for S-P conversions and P-P reflections.

37. The method of claim 35, wherein creating an ST plane further comprises reversing positions of wave conversion areas, wave reflection areas, or both wave conversion and wave reflection areas of the ST plane with a transmitter array.

38. A method of removing noise from a fracture image created using data from an ST plane comprising:

reversing positions of wave conversion areas, wave reflection areas, or both wave conversion and wave reflection areas of the ST plane to distinguish between any overlapping areas.

39. The method of claim 38, wherein the reversing of wave reflection areas further comprises reversing between P-P reflections generated from an upper side and a lower side of a fracture.

40. The method of claim 38, wherein the reversing positions is facilitated by an array of acoustic transmitters and receivers.

41. A method of using an ST plane for indication of a subsurface fracture comprising:

windowing a first portion of the ST plane between an approximate end of a compressional wave and an approximate start of a shear wave on a time axis of the ST plane, and between approximate areas of the ST plane slower than the compressional wave and faster than the shear wave on a slowness axis for P-S wave conversions;

windowing a second portion of the ST plane between the approximate end of the compressional wave and the approximate start of the shear wave on the time axis of the ST plane, and in areas of the ST plane approximately faster than the compressional wave on a slowness axis for S-P conversions and P-P reflections; and projecting acoustic data from the ST plane onto a time axis.

* * * * *